United States Patent [19]

Tokunaga et al.

[11] Patent Number: 5,279,896
[45] Date of Patent: Jan. 18, 1994

[54] HEAT-RESISTANT VIBRATION-DAMPING PRESSURE-SENSITIVE ADHESIVE COMPOSITION, PROCESS FOR PRODUCING THE SAME AND VIBRATION-DAMPING ADHESIVE TAPE OR SHEET USING THE COMPOSITION

[75] Inventors: Yasuyuki Tokunaga; Yutaka Moroishi; Nobuharu Suzuki, all of Osaka, Japan

[73] Assignee: Nitto Denko Corporation, Osaka, Japan

[21] Appl. No.: 973,697

[22] Filed: Nov. 9, 1992

[30] Foreign Application Priority Data

Nov. 11, 1991 [JP] Japan .................................. 3-323697

[51] Int. Cl.$^5$ .................... B32B 7/10; C08F 220/06
[52] U.S. Cl. ........................ 428/355; 526/318.4; 524/100; 524/290
[58] Field of Search ............... 526/318.4; 524/100, 524/290; 428/355

[56] References Cited

U.S. PATENT DOCUMENTS

| H509 | 8/1988 | Chao et al. ...................... 526/264 |
| 3,983,297 | 9/1976 | Ono et al. . |
| 4,374,231 | 2/1983 | Doucet ............................ 525/179 |
| 4,418,120 | 11/1983 | Kealy et al. ...................... 428/343 |
| 4,694,056 | 9/1987 | Lenny ............................ 526/202 |
| 4,751,269 | 6/1988 | Bonk et al. ...................... 525/163 |
| 4,843,134 | 6/1989 | Kotnour et al. ................. 526/318.4 |
| 4,861,822 | 8/1989 | Keskey et al. .................... 524/559 |
| 4,925,908 | 5/1990 | Bernard et al. ................... 526/320 |

FOREIGN PATENT DOCUMENTS 0147067 7/1985 European Pat. Off. .
5225 7/1969 Fed. Rep. of Germany .

OTHER PUBLICATIONS

Japanese Industrial Standard JIS-G-4305 (1991).

*Primary Examiner*—Joseph L. Schofer
*Assistant Examiner*—Mark Nagumo
*Attorney, Agent, or Firm*—Sughrue, Mion, Zinn, Macpeak & Seas

[57] ABSTRACT

A vibration-damping pressure-sensitive adhesive composition containing a crosslinked structure of a copolymer comprising (A) from 75 to 92% by weight of a main monomer comprising an alkyl (meth)acrylate containing from 8 to 12 carbon atoms in the alkyl moiety thereof and (B) from 8 to 25% by weight of a carboxyl-containing monomer whose homopolymer has a glass transition temperature of 50° C. or more, said crosslinked structure having a solvent-insoluble content of 80% by weight or more and a weight loss of 3% by weight or less on heating at 120° C. for 240 hours, and said composition having a T-peel strength of 400 g/20 mm-width or more from a SUS plate and a loss factor of 0.05 or more at 60° C. in the vicinity of 1 kHz as determined by a half-value width method. The composition exhibits satisfactory heat resistance against long-term use in high temperatures as well as satisfactory adhesion to various parts at room temperature.

7 Claims, No Drawings

HEAT-RESISTANT VIBRATION-DAMPING PRESSURE-SENSITIVE ADHESIVE COMPOSITION, PROCESS FOR PRODUCING THE SAME AND VIBRATION-DAMPING ADHESIVE TAPE OR SHEET USING THE COMPOSITION

FIELD OF THE INVENTION

This invention relates to a vibration-damping pressure-sensitive adhesive composition with excellent heat resistance, a process for producing the same, and a vibration-damping adhesive tape or sheet using the adhesive composition.

BACKGROUND OF THE INVENTION

Pressure-sensitive adhesives in tape or sheet form are used in various applications. Damping adhesives for vibration insulation are among them. Adhesives of this type have been widely applied to automobile parts, various appliances, etc. as a means for reducing vibration or noise, and many studies have been made on temperature characteristics of their vibration-damping properties for making the best use thereof at the working temperature.

Requirements for the vibration-damping adhesives have been increasing year by year. For use in appliances, in particular, demands for durability and reliability in high working temperatures have become severer. However, most of the pressure-sensitive adhesives of this type, which mainly comprise high polymeric materials, undergo decomposition or oxidation on long-term use at high temperatures, causing various problems. For example, decomposition or oxidation of the high polymeric material leads to hardening or oozing of the adhesive and generates decomposition gases. This results in a reduction of vibration-damping properties and pollution of the surrounding air. The currently available vibration-damping pressure-sensitive adhesives are unsatisfactory from this point of view.

SUMMARY OF THE INVENTION

As a result of extensive investigations, it has now been found that a specific crosslinked structure obtained by crosslinking an acrylic copolymer having a specific monomer composition by an appropriate means is excellent in both adhesion and heat resistance and is therefore extremely suitable as a vibration-damping pressure-sensitive adhesive. The present invention has been completed based on this finding.

Accordingly, one object of the present invention is to provide a vibration-damping pressure-sensitive adhesive composition having sufficient heat resistance withstanding long-term use in high temperatures as well as satisfactory adhesiveness to various parts at room temperature.

Another object of the present invention is to provide a process for producing the adhesive composition.

Still another object of the present invention is to provide a vibration-damping adhesive tape or sheet using the adhesive composition.

The present invention relates to a vibration-damping pressure-sensitive adhesive composition with excellent heat resistance containing a crosslinked structure of a copolymer comprising (A) from 75 to 92% by weight of a main monomer comprising an alkyl (meth)acrylate containing from 8 to 12 carbon atoms in the alkyl moiety thereof and (B) from 8 to 25% by weight of a carboxyl-containing monomer whose homopolymer has a glass transition temperature (Tg) of 50° C. or more, the crosslinked structure having a solvent-insoluble content of 80% by weight or more and a weight loss of 3% by weight or less on heating at 120° C. for 240 hours, and the composition having a T-peel strength of 400 g/20 mm-width or more from a SUS plate and a loss factor of 0.05 or more at 60° C. in the vicinity of 1 kHz as determined by a half-value width method.

The present invention also relates to a process for producing a vibration-damping pressure-sensitive adhesive composition with excellent heat resistance, which comprises adding (C) a polyfunctional monomer as an internal crosslinking agent and (D) a hindered phenol type antioxidant to a monomer mixture comprising (A) from 75 to 92% by weight of a main monomer comprising an alkyl (meth)-acrylate containing from 8 to 12 carbon atoms in the alkyl moiety thereof and (B) from 8 to 25% by weight of a carboxyl-containing monomer whose homopolymer has a glass transition temperature (Tg) of 50° C. or more, and subjecting the mixture to bulk polymerization.

The present invention further relates to a vibration-damping adhesive tape or sheet comprising a liner or substrate having formed thereon a pressure-sensitive adhesive composition with excellent heat resistance containing a crosslinked structure of a copolymer comprising (A) from 75 to 92% by weight of a main monomer comprising an alkyl (meth)acrylate containing from 8 to 12 carbon atoms in the alkyl moiety thereof and (B) from 8 to 25% by weight of a carboxyl-containing monomer whose homopolymer has a glass transition temperature (Tg) of 50° C. or more, the crosslinked structure having a solvent-insoluble content of 80% by weight or more and a weight loss of 3% by weight or less on heating at 10° C. for 240 hours, and the composition having a T-peel strength of 400 g/20 mm-width or more from a SUS plate and a loss factor of 0.05 or more at 60° C. in the vicinity of 1 kHz as determined by a half-value width method.

DETAILED DESCRIPTION OF THE INVENTION

The alkyl (meth)acrylate which can be used in the present invention has a long-chain alkyl group containing from 8 to 12 carbon atoms in the side chain thereof. Because of the long side chain, the alkyl (meth)acrylate has a broad range of a glass transition temperature, which greatly influences vibration-damping properties, and therefore contributes to high vibration damping over a broad temperature range. Specific examples of the alkyl (meth)-acrylate are isooctyl (meth)acrylate, 2-ethylhexyl (meth)-acrylate, isononyl (meth)acrylate, and isodecyl (meth)-acrylate.

Main monomer (A) may solely comprise the above-described alkyl (meth)acrylate or, if desired, may further comprise other monomers copolymerizable therewith. The proportion of the other copolymerizable monomer(s) is preferably up to 30% by weight based on the weight of the total monomers. Use of the other monomers in too a high proportion leads to reductions in adhesion and vibration-damping properties. Examples of usable other monomers include vinyl acetate, acrylonitrile, acrylamide, styrene, and derivatives thereof.

The carboxyl-containing monomer (B) is a compound whose homopolymer has a Tg of 50° C. or higher, and preferably from 80° to 190° C. Accordingly, when copolymerized with monomer (A), monomer (B) acts to increase the Tg of the resulting copolymer to a practical temperature range to thereby endow the adhesive with satisfactory vibration-damping properties. In addition, the carboxyl group existing as a polar group in the resulting copolymer makes a great contribution to adhesion to metals, etc. Specific examples of the carboxyl-containing monomer include (meth)-acrylic acid, maleic acid, maleic anhydride, itaconic acid, fumaric acid, and crotonic acid.

Main monomer (A) and carboxyl-containing monomer (B) should be used in amounts of from 75 to 92% by weight, preferably from 80 to 90% by weight, and from 8 to 25% by weight, preferably from 10 to 20% by weight, respectively.

If the proportion of monomer (B) exceeds 25% by weight, the resulting copolymer has too a high Tg and too a high polar group content. As a result, the copolymer has an increased modulus of elasticity and thus has reduced adhesion. If it is less than 8% by weight, the Tg of the resulting copolymer cannot be sufficiently increased, and the copolymer has reduced vibration-damping properties at high temperatures of around 60° C. Further, the polar group content of the copolymer is too low to obtain substantial improvement in adhesion.

In the present invention, the copolymer comprising monomers (A) and (B) is subjected to a crosslinking treatment so as to have a solvent-insoluble content of at least 80% by weight, and preferably 90% by weight or more.

In general, a copolymer having the above-described monomer composition and its crosslinked structure may be prepared by once obtaining a copolymer by solution polymerization, emulsion polymerization, suspension polymerization or the like polymerization technique, adding a crosslinking agent comprising a polyfunctional compound, such as an isocyanate compound or an epoxy compound, to the resulting copolymer, and then inducing a crosslinking reaction. Such a process being followed, however, a large quantity of a crosslinking agent must be used for achieving such a high degree of crosslinking as reaching a solvent-insoluble content of 80% by weight or more. This being the case, the crosslinking reaction rapidly proceeds on addition of the crosslinking agent, and the reaction system will soon increase its viscosity and become incapable of coating. Also, the resulting copolymer will undergo a reduction in adhesion due to the increased modulus of elasticity, failing to maintain satisfactory adhesion characteristics.

In order to overcome these problems, the present invention adopts a specific process in which (C) a polyfunctional monomer is used as an internal crosslinking agent in the preparation of the copolymer. That is, a monomer mixture containing such an internal crosslinking agent (C) is subjected to bulk polymerization by ultraviolet or electron irradiation to achieve copolymerization simultaneously with crosslinking.

According to the above-described process of the present invention, the reaction proceeds while keeping the monomer state or in a prepolymer state of low viscosity under easy control. As a result, no disadvantages of viscosity characteristics occur in coating on a substrate. Further, an increase in the solvent-insoluble content of the crosslinked structure is not accompanied by a great reduction in adhesion probably because of an increase in wetting attributed to the increase in molecular weight or freedom of the segments among crosslinking sites.

On the other hand, where a crosslinked structure of a copolymer obtained by the above-described bulk polymerization or general solution polymerization is used as a vibration-damping pressure-sensitive adhesive, it is deteriorated at high temperatures due to oxidation and decomposition, not only causing a weight loss and contamination of the surrounding air with the decomposition gases but also suffering from a reduction in adhesion, leading to a reduction in vibration-damping properties.

Early in the study, the inventors had considered that this problem could be solved by adding an antioxidant commonly employed in rubber-based pressure-sensitive adhesives. While such an antioxidant can be uniformly compounded into a polymer obtained by solution polymerization or emulsion polymerization, it must be usually added to a monomer mixture before polymerization in the case of bulk polymerization. In this case, there arise the following problems to be considered.

Polymer production and internal crosslinking are induced by a radical reaction. An antioxidant has an action of trapping a radical, which adversely affects the properties of the resulting polymer. Therefore, if the antioxidant is added to the polymerization system, it generally traps the radicals generated during polymerization and hinders the polymerization and internal crosslinking reaction serving as a so-called polymerization inhibitor. Besides, on trapping the generated radicals, the antioxidant reduces its function as an antioxidant after the reaction.

Taking these problems into consideration, the inventors have conducted extensive experiments on various types of conventional antioxidants. As a result, they have found that hindered phenol type antioxidants among the conventional antioxidants do not cause substantial hinderance of the polymer production and internal crosslinking. Also, antioxidants of this type retain the function as an antioxidant after the reaction to satisfactorily prevent oxidation and decomposition of the crosslinked structure at high temperatures. This seems to be because the radical trapping action of these antioxidants is relatively mild for the amount of the radical generated during the polymerization reaction and for the reaction rate of the monomers.

Accordingly, a crosslinked structure obtained by ultraviolet- or electron-induced bulk polymerization of a monomer mixture comprising monomers (A) and (B), (C) a polyfunctional monomer as an internal crosslinking agent, and (D) a hindered phenol type antioxidant provides a vibration-damping pressure-sensitive adhesive composition with satisfactory heat resistance which is free from the viscosity problem on coating, which undergoes no great reduction in adhesion even with an increase in solvent-insoluble content, and which withstands use in high temperatures without being deteriorated.

Examples of the polyfunctional monomer (C) which can be used as an internal crosslinking agent in the bulk polymerization include ethylene glycol di(meth)acrylate, pentaerythritol tri(meth)acrylate, tetramethylolmethane tetra(meth)acrylate, and trimethylolpropane tri(meth)-acrylate.

The polyfunctional monomer (C) is suitably used in an amount of from 0.2 to 2 parts by weight per 100 parts by weight of the monomer mixture of monomers (A) and (B). If its amount is less than 0.2 part, a sufficient degree of crosslinking to have a solvent-insoluble content of 80% by weight or more cannot be obtained. If it exceeds 2 parts, the resulting polymer would have too a high modulus of elasticity, resulting in a reduction in adhesion.

Examples of the hindered phenol type antioxidant (D) to be used in the bulk polymerization are pentaerythrityl-tetrakis[3-(3,5-di-t-butyl-4-hydroxyphenyl)propionate], and 2,4-bis(n-octylthio)-6-(4-hydroxy-3,5-di-t-butylanilino)-1,3,5-triazine.

The hindered phenol type antioxidant (D) is used in an amount of from 0.2 to 5 parts by weight, and preferably from 0.5 to 2 parts by weight, per 100 parts by weight of the monomer mixture of monomers (A) and (B). If its amount is less than 0.2 part, satisfactory heat resistance cannot be obtained. Namely, the resulting adhesive has a weight loss exceeding 3% by weight on heating at 120° C. for 240 hours. If the amount exceeds 5 parts, the action of hindering the bulk polymerization would be considerable and, as a result, a low-molecular weight polymer is produced in a large proportion to cause deterioration of adhesion characteristics.

The bulk polymerization is carried out by electron or ultraviolet irradiation. In the case of ultraviolet-induced polymerization, it is recommended to previously add a photopolymerization initiator, such as 1-hydroxycyclohexyl phenyl ketone, benzyl dimethyl ketal, or benzophenone, to the monomer mixture. The photopolymerization initiator is usually added in an amount of from about 0.1 to 10 parts by weight per 100 parts by weight of the monomer mixture of monomers (A) and (B).

Where the monomer mixture comprising monomers (A) and (B), internal crosslinking agent (C), and hindered phenol type antioxidant (D) is coated on a liner or any other substrate and the above-described bulk polymerization is effected in situ, there is obtained adhesive tape or sheet having a vibration-damping pressure-sensitive adhesive composition having a solvent-insoluble content of 80% by weight or more and a weight loss on heating at 120° C. for 240 hours of 3% by weight or less. The resulting pressure-sensitive adhesive tape or sheet may be subjected to further processing, such as punching, to obtain any desired shape.

The pressure-sensitive adhesive composition having a tape or sheet form has a peel strength of 400 g/20 mm-width or more, and preferably from 450 to 1200 g/mm-width, in a T-peel test using a SUS plate and a loss factor at 60° C. in the vicinity 1 kHz of 0.05 or more, and preferably from 0.06 to 0.20, as determined by a half-value width method. Thus, the pressure-sensitive adhesive composition in tape or sheet form exhibits high adhesion, excellent vibration-damping properties, and satisfactory heat resistance and is widely applicable to automobile parts, appliances, and precision parts.

As described above, the vibration-damping pressure-sensitive adhesive composition according to the present invention comprising, as a base polymer, a specific crosslinked structure obtained by crosslinking an acrylic copolymer having a specific monomer composition through an appropriate means exhibits satisfactory adhesion characteristics for achieving easy adhesion to various parts at room temperature and also satisfactory heat resistance for withstanding long-term use in high temperatures.

The present invention is now illustrated in greater detail with reference to Examples, but it should be understood that the present invention is not deemed to be limited thereto. All the parts are by weight unless otherwise indicated.

The solvent-insoluble content and heating weight loss of the crosslinked structure of the copolymer prepared and the T-peel strength and vibration-damping properties of the resulting vibration-damping pressure-sensitive adhesive composition were measured and evaluated as follows.

1) Solvent-Insoluble Content

A cut sample weighing about 0.1 g was immersed in isopropyl alcohol at room temperature for 5 days. The sample was picked up with a pair of forceps, transferred into an aluminum cup, and dried at 130° C. for 2 hours. The solvent-insoluble content (X; wt. %) was calculated from the weight change after the drying according to equation:

$$X = \frac{\text{Weight after Immersion and Drying}}{\text{Weight before Immersion}} \times 100$$

2) Heating Weight Loss

A cut sample weighing about 0.1 g was put in a prescribed aluminum cup and heated in an oven at 120° C. After 240 hour-heating, the aluminum cup as containing the sample was taken out. The heating weight loss (Y; wt. %) was calculated according to equation:

$$Y = \frac{\text{Weight before Heating} - \text{Weight after Heating}}{\text{Weight Before Heating}} \times 100$$

3) T-Peel Strength

A sample was coated on a liner to a thickness of 50 μm. The sample layer was interposed between a pair of SUS 304 foils each having a thickness of 50 μm and bonded by a double stroke of a rubber roller (2 kg). After allowing the thus prepared specimen to stand for about 30 minutes, a T-peel test was conducted at 23° C. at a pulling speed of 300 mm/min by means of "Tensilon UMT-4-100" manufactured by Toyo Baldwin Co. The test specimen had a width of 20 mm.

4) Vibration-Damping Properties

A test specimen having a length of 110 mm and a width of 20 mm was prepared from a 500 μm thick SUS 304 sheet as a base, a 50 μm thick film of a sample, and a 50 μm thick SUS 304 sheet as a restrainer.

The vibration-damping properties were measured by a mechanical impedance method by the use of a measuring apparatus manufactured by IMV. A transfer function was obtained for the resonant point at 60° C. in the vicinity of 1 kHz, and the loss factor was then obtained by a half-value width method.

EXAMPLE 1

100 Parts of monomer mixture of 90 parts of isooctyl acrylate and 10 parts of acrylic acid were blended with 1 part of "Irgacure 184" (a photopolymerization initiator produced by Ciba Geigy). After thoroughly purging with nitrogen, the mixture was irradiated with ultraviolet light emitted from a high-pressure mercury lamp at a dose of about 100 mJ/cm$^2$.

The resulting viscous substance was mixed with 0.2 part of trimethylolpropane triacrylate as an internal crosslinking agent and 2 parts of 2,4-bis(n-octylthio)-6-(4-hydroxy-3,5-di-t-butylanilino)-1,3,5-triazine as an antioxidant, and the composition was coated on a liner to a thickness of 50 μm. The coated film was covered with a liner made of polyethylene terephthalate (PET) to protect from oxygen which might cause polymerization hinderance, and ultraviolet light of about 1400 mJ/cm² from a high-pressure mercury lamp was irradiated thereon to obtain vibration-damping pressure-sensitive adhesive composition in tape form.

EXAMPLE 2

A viscous substance was obtained in the same manner as in Example 1, except for using a monomer mixture of 85 parts of 2-ethylhexyl acrylate and 15 parts of acrylic acid.

A vibration-damping pressure-sensitive adhesive composition in tape form was prepared in the same manner as in Example 1, except for mixing the viscous substance with 2 parts of ethylene glycol diacrylate as an internal crosslinking agent and 0.2 part of pentaerythrityltetrakis[3-(3,5-di-t-butyl-4-hydroxyphenyl)propionate] as an antioxidant.

EXAMPLE 3

100 Parts of a monomer mixture of 85 parts of 2-ethylhexyl acrylate, 5 parts of acrylonitrile, and 10 parts of acrylic acid were blended with 3 parts of "Irgacure 651" (a photopolymerization initiator produced by Ciba Geigy). After thoroughly purging with nitrogen, the mixture was irradiated with ultraviolet light emitted from a high-pressure mercury lamp at a dose of about 100 mJ/cm².

The resulting viscous substance was mixed with 1 part of pentaerythritol triacrylate as an internal crosslinking agent and 1 part of pentaerythrityl-tetrakis[3-(3,5-di-t-butyl-4-hydroxyphenyl)propionate] as an antioxidant, and the composition was coated on a liner to a thickness of 50 μm. The coated film was covered with a PET liner, and ultraviolet light of about 1400 mJ/cm² from a high-pressure mercury lamp was irradiated thereon to obtain a vibration-damping pressure-sensitive adhesive composition in tape form.

COMPARATIVE EXAMPLE 1

A vibration-damping pressure-sensitive adhesive composition in tape form was prepared in the same manner as in Example 1, except for using a monomer mixture of 95 parts of isooctyl acrylate and 5 parts of acrylic acid.

COMPARATIVE EXAMPLE 2

A vibration-damping pressure-sensitive adhesive composition in tape form was prepared in the same manner as in Example 2, except for adding no antioxidant to the viscous substance.

COMPARATIVE EXAMPLE 3

100 Parts of a monomer mixture of 85 parts of isooctyl acrylate and 15 parts of acrylic acid were blended with 150 parts of ethyl acetate and 0.1 part of azobisisobutyronitrile, and the resulting solution was subjected to solution polymerization at 60° C. for about 7 hours in a nitrogen atmosphere to obtain a polymer solution.

To 100 parts of the polymer solution was added 0.4 part of 1,3-bis(N,N-diglycidylaminomethyl)cyclohexane, and 1 part of 2,4-bis(n-octylthio)-6-(4-hydroxy-3,5-di-t-butylanilino)-1,3,5-triazine was further added thereto as an antioxidant to obtain a pressure-sensitive adhesive solution. The adhesive solution was coated on a liner to a dry thickness of 50 μm and dried at 120° C. for 5 minutes to obtain a vibration-damping pressure-sensitive adhesive composition in tape form.

Each of the pressure-sensitive adhesive compositions (equal to crosslinked structures) obtained in the above Examples and Comparative Examples was evaluated according to the above-described methods. The results obtained are shown in Table 1.

TABLE 1

| Example No. | Solvent-Insoluble Content (wt %) | Heating Weight Loss (wt %) | T-Peel Strength (g/20 mm) | Dissipation Factor |
|---|---|---|---|---|
| Example 1 | 81 | 1.9 | 880 | 0.051 |
| Example 2 | 96 | 2.7 | 560 | 0.095 |
| Example 3 | 92 | 2.5 | 470 | 0.096 |
| Comparative Example 1 | 82 | 2.0 | 130 | 0.037 |
| Comparative Example 2 | 96 | 23.0 | 550 | 0.093 |
| Comparative Example 3 | 89 | 2.6 | 270 | 0.095 |

As in apparent from Table 1, the vibration-damping pressure-sensitive adhesive composition according to the present invention exhibits satisfactory heat resistance as well as excellent adhesion and vibration-damping properties and is extremely suitable as a pressure-sensitive adhesive for vibration insulating parts.

While the invention has been described in detail and with reference to specific examples thereof, it will be apparent to one skilled in the art that various changes and modifications can be made therein without departing form the spirit and scope thereof.

What is claimed is:

1. A vibration-damping pressure-sensitive adhesive composition containing a crosslinked structure of a copolymer comprising (A) from 75 to 92% by weight of a main monomer comprising an alkyl (meth)acrylate containing from 8 to 12 carbon atoms in the alkyl moiety thereof, (B) form 8 to 25% by weight of a carboxyl-containing monomer whose homopolymer has a glass transition temperature of 50° C. or more, (C) a polyfunctional free radically polymerizable monomer as a cross-linking agent in an amount of from 0.2 to 2 parts by weight per 100 parts by weight of the monomer mixture of (A) and (B), and (D) a hindered phenol antioxidant in an amount of from 0.2 to 5 parts by weight per 100 parts by weight of the monomer mixture of (A) and (B), wherein said crosslinked structure comprises a solvent-insoluble content of 80% by weight or more and a weight loss of 3% by weight or less on heating at 120° C. for 240 hours, and said composition comprises a T-peel strength of 400 g/20 mm-width or more from a SUS plate and a loss factor of 0.05 or more at 60° C. int eh vicinity of 1 kHz as determined by a half-value width method.

2. A composition as claimed in claim 1, wherein the amount of the main monomer is from 80 to 90% by weight.

3. A composition as claimed in claim 1, wherein the main monomer comprises the alkyl (meth)acrylate and up to 30% by weight of a monomer copolymerizable therewith.

4. A composition as claimed in claim 1, wherein the amount of the carboxyl-containing monomer is from 10 to 20% by weight.

5. A composition as claimed in claim 1, wherein said homopolymer of (B) has a glass transition temperature of from 80 to 190° C.

6. A composition as claimed in claim 1, wherein the crosslinked structure has the solvent-insoluble content of 90% by weight or more.

7. A vibration-damping adhesive tape or sheet comprising a liner or substrate having formed thereon a pressure-sensitive adhesive composition containing a crosslinked structure of a copolymer comprising (A) from 75 to 92% by weight of a main monomer comprising an alkyl (meth)acrylate containing form 8 to 12 carbon atoms int he alkyl moiety thereof, (B) from 8 to 25% by weight of a carboxyl-containing monomer whose homopolymer has a glass transition temperature of 50° C. or more, (C) a polyfunctional free-radically polymerizable monomer as a cross-linking agent in an amount of from 0.2 to 2 parts by weight per 100 parts by weight of the monomer mixture of (A) and (B), and (D) a hindered phenol antioxidant in an amount of from 0.2 to 5 parts by weight per 100 parts by weight of the monomer mixture of (A) and (B), wherein said crosslinked structure comprises a solvent-insoluble content of 80% by weight or more and a weight loss of 3% by weight or less on heating at 120° C. for 240 hours, and said composition comprises a T-peel strength of 400 g/20 mm-width or more from a SUS plate and a loss factor of 0.05 or more at 60° C. in the vicinity of 1 kHz as determined by a half-value width method.

* * * * *